(12) United States Patent
Akutsu et al.

(10) Patent No.: US 6,418,614 B2
(45) Date of Patent: *Jul. 16, 2002

(54) CUTTING APPARATUS FOR ROLL-FORMED PRODUCT OF ROLL-FORMING UNIT

(75) Inventors: Tomoaki Akutsu; Harumi Obata, both of Gunma (JP)

(73) Assignee: Calsonic Kansei Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/414,639

(22) Filed: Oct. 8, 1999

(51) Int. Cl.⁷ ............................................. B23P 15/26
(52) U.S. Cl. ..................... 29/727; 29/890.049; 29/712; 83/436.7; 83/436.8
(58) Field of Search ................ 29/727, 33 G, 29/890.049, 726, 712, 785, 792, 822; 83/156, 436.3, 436.4, 436.5, 436.6, 436.7, 436.8, 436.9, 613; 198/576, 575, 467.1, 459.3

(56) References Cited

U.S. PATENT DOCUMENTS

| | | | | |
|---|---|---|---|---|
| 3,075,630 A | * | 1/1963 | Fisk | |
| 3,122,230 A | * | 2/1964 | Bogue | |
| 4,353,162 A | * | 10/1982 | Van Meteren | 29/727 |
| 4,514,900 A | * | 5/1985 | Benard | 29/727 |
| 4,542,568 A | * | 9/1985 | Venables, III et al. | 29/727 |
| 4,557,169 A | * | 12/1985 | Kajiya et al. | |
| 4,635,512 A | * | 1/1987 | Wengenroth et al. | |
| 4,781,091 A | * | 11/1988 | Nakaya | |
| 4,860,619 A | * | 8/1989 | Yunoki | |
| 5,058,725 A | * | 10/1991 | Gamberini et al. | |
| 5,086,678 A | * | 2/1992 | Aoyagi et al. | |
| 5,454,286 A | * | 10/1995 | Takaha | |
| 5,732,460 A | * | 3/1998 | Paternoster et al. | 29/727 |
| 5,752,312 A | * | 5/1998 | Harman et al. | 29/33 G |
| 5,781,987 A | * | 7/1998 | Castren | 29/727 |
| 5,878,641 A | * | 3/1999 | Tsune | |
| 5,934,443 A | * | 8/1999 | Pardi et al. | |
| 6,067,704 A | * | 5/2000 | Warren et al. | 29/727 |
| 6,276,513 B1 | * | 8/2001 | Asano et al. | |

FOREIGN PATENT DOCUMENTS

| | | | |
|---|---|---|---|
| EP | 0052592 | * | 5/1982 |
| JP | 58-154425 | * | 9/1983 |
| JP | 58-202932 | * | 11/1983 |
| JP | 59-107736 | * | 6/1984 |
| JP | 62-3840 | * | 1/1987 |
| JP | 3-166023 | | 7/1991 |
| JP | 3-199896 | | 8/1991 |
| JP | 4-35831 | | 3/1992 |
| JP | 4-113113 | | 10/1992 |
| JP | 6-114455 | | 4/1994 |
| JP | 9-85542 | | 3/1997 |
| JP | 9-885541 | | 3/1997 |
| JP | 11-70424 | | 3/1999 |

* cited by examiner

Primary Examiner—I Cuda Rosenbaum
Assistant Examiner—T. Nguyen
(74) Attorney, Agent, or Firm—Foley & Lardner

(57) ABSTRACT

An apparatus for cutting a roll-formed product for a roll-forming unit has at least a roll-forming machine. The cutting apparatus has a cutter mechanism arranged downstream of the roll-forming machine, for cutting the roll-formed product sent out from the roll-forming machine into a predetermined cut length. The cutters apparatus further has a feed roller rotatable at a controlled rotational speed, for sending out a formed product cut by the cutter mechanism.

7 Claims, 4 Drawing Sheets

CUTTING APPARATUS FOR ROLL-FORMED PRODUCT OF ROLL-FORMING UNIT

BACKGROUND OF THE INVENTION

1. Field of the Invention

The present invention relates to a manufacturing apparatus for producing a heat exchanger for an air conditioning system, and specifically to a heat-exchanger tube manufacturing apparatus of a group of heat-exchanger manufacturing apparatus, namely (a) a header pipe manufacturing apparatus which produces a header pipe by forming a flat metal plate material such as metal sheet into a cylindrical shape by way of pressing, (b) a heat-exchanger tube manufacturing apparatus which produces a U-shaped, roll-formed product (often called a "holder") by roll-forming a band-like or strip-like metallic material, and then produces a heat-exchanger tube by inserting an inner fin, produced by pressing or roll-forming, into the "holder", (c) an outer-fin manufacturing apparatus which forms a strip-like metallic material into a corrugated fin (an outer fin) by means of a corrugate cutter, and (d) an assembling apparatus for producing an assembled product by assembling the header pipe produced by the header pipe manufacturing apparatus with a sub-assembly produced by stacking the heat exchanger tube obtained through the heat-exchanger tube manufacturing apparatus and the outer fin obtained through the outer-fin manufacturing apparatus, and more specifically to the improvements of an apparatus for cutting a roll-formed product of a roll-forming unit used for roll-forming a band-like or strip-like metallic material.

2. Description of the Prior Art

As is generally known, on a typical roll-forming unit, an apparatus, used to cut a roll-formed product, is placed side by side with a roll-forming machine, usually in back of the roll-forming machine, that is, at the late stage of roll forming. A roll-formed product, continuously roll-formed by means of the roll-forming machine, is sent out toward the cutting apparatus. Then, the roll-formed product sent out is cut into a predetermined length by means of the roll-formed product cutting apparatus. After termination of one cycle of cutting process, the rear end of the product cut at this cutting cycle remains within the roll-formed product cutting apparatus. The product cut at this cutting cycle will be hereinafter referred to as a "the previous cut product". The previous cut product is pushed out the cutting apparatus by the front end of a succeeding roll-formed product sent into the cutting apparatus subsequently thereto, and then flows to a next process. In such a conventional way that the previous cut product is sent out from within the cutting apparatus by virtue of introduction of the succeeding roll-formed product into the entry of the cutting apparatus, it is necessary to increase a roll-forming speed of the succeeding product subjected to roll forming, and consequently to increase a feed speed of the succeeding roll-formed product into the cutting apparatus, in order to rapidly accurately push out the previous cut product from with in the cutting apparatus to a predetermined position at the end of the cutting process. The excessive feed speed of the succeeding roll-formed product increases the possibility that the previous cut product is sprung or jumped overflowed out of the predetermined backward position. In the case where, in case that the roll-forming line is arranged in a direction perpendicular to the conveyance line of the cut product, there is a risk that the cut product may be overflowed out of the predetermined downstream position or jumped out of the conveyance line. It is difficult and troublesome to accurately optimally adjust or control the feed speed of the succeeding roll-formed product.

SUMMARY OF THE INVENTION

Accordingly, it is an object of the invention to provide an apparatus for cutting a roll-formed product of a roll-forming unit which avoids the aforementioned disadvantages of the prior art.

It is another object of the invention to provide a roll-formed product cutting apparatus of a roll-forming unit, capable of accurately properly sending out toward within a predetermined position on a conveyance line of the cut product, in each cutting process.

In order to accomplish the aforementioned and other objects of the present invention, an apparatus for cutting a roll-formed product for a roll-forming unit having at least a roll-forming machine comprises a cutter mechanism and a feed roller. The cutter mechanism cuts the roll-formed product fed from the roll-forming machine into a predetermined cut length. The feed roller feeds the cut roll-formed product to a screw conveyor positioned downstream of the cutter mechanism. The feed roller is controlled to rotate so that the feed roller is timed to feed the cut roll-formed product into a designated position of the screw conveyor.

The cutter mechanism can comprise a movable cutter movable toward and away from the roll-formed product in a direction perpendicular to the flow of the roll-formed product, a cutter guide for guiding the roll-formed product so that the roll-formed product passes through the cutter guide, and for guiding the movable cutter while being in sliding-contact with the movable cutter, and a roll-formed product introducing guide for introducing the roll-formed product toward within the cutter guide, while horizontally supporting the roll-formed product.

It is preferable that the movable cutter be located above the roll-formed product, whereas the feed roller can be located below the roll-formed product; also the movable cutter is arranged substantially midway between the roll-formed product introducing guide and the feed roller, and the roll-formed product introducing guide and the feed roller can cooperate with each other to horizontally support the roll-formed product.

According to another aspect of the invention, in a system for manufacturing a heat exchanger tube, an apparatus for-cutting a roll-formed product for a roll-forming unit having at least a roll-forming machine roll-forming a strip material into a predetermined shape to produce the roll-formed product, and a drier for removing fatty material adhered onto the roll-formed product to produce a roll-formed, degreased product, the cutters apparatus comprises a cutter mechanism, a feed roller, and a sensor. The cutter mechanism cuts. The cutter mechanism suts the roll-formed, degreased product fed from the drier into a predetermined cut length. The feed roller feeds the cut roll-formed, degreased product to a screw conveyor positioned downstream of the cutter mechanism. The feed roller is also controlled to rotate so that the feed roller is timed to feed the cut roll-formed, degreased product into a designated position of the screw conveyor. The sensor detects a passing state of the roll-formed, degreased product cut by the cutter mechanism, so that an introduction timing of the roll-formed, degreased product into the cutter mechanism and a cutting timing of the roll-formed, degreased product are adjusted by the passing state detected by the sensor.

DESCRIPTION OF THE PREFERRED EMBODIMENTS

Figure 3:
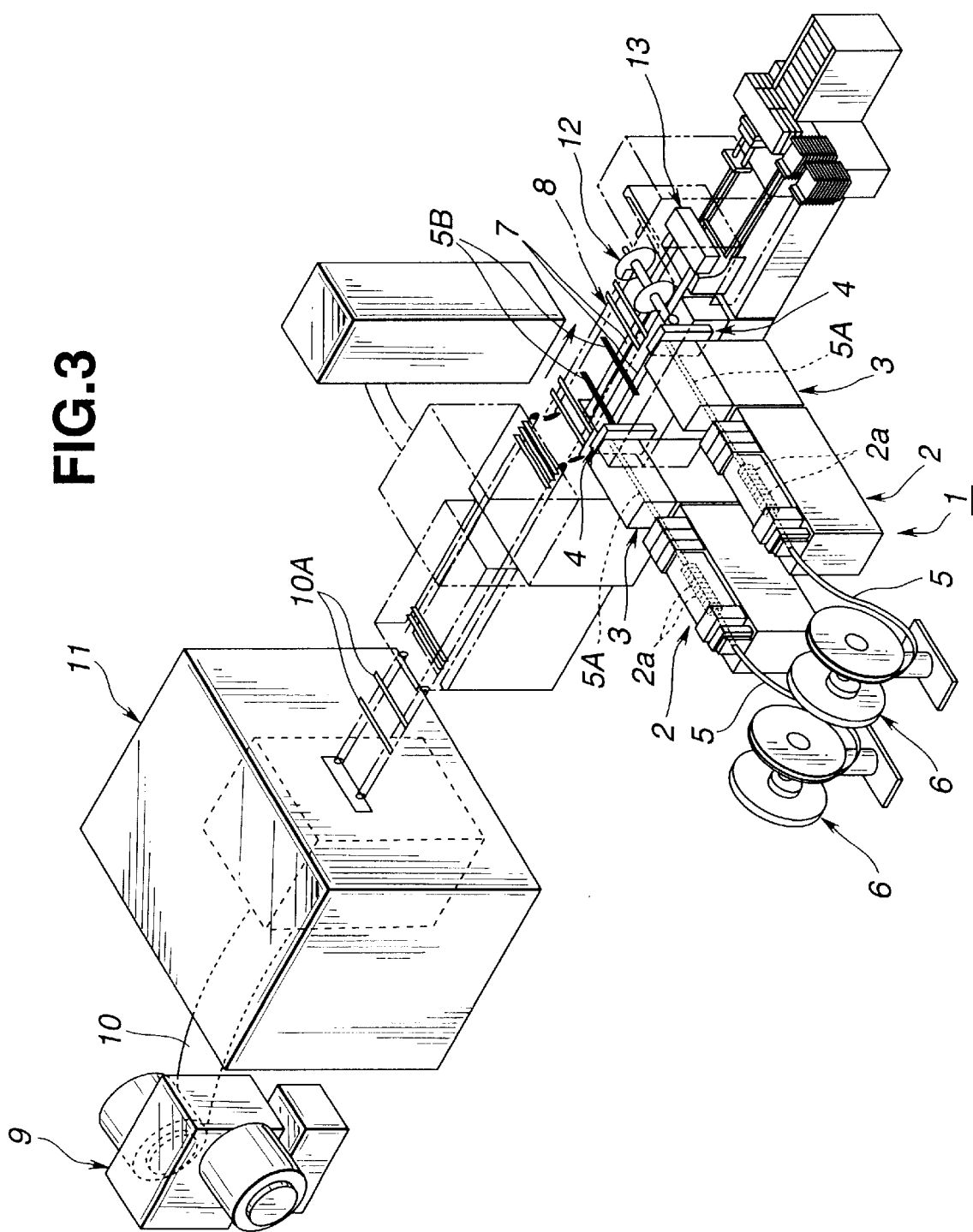
FIG. 3 is an explanatory view showing an example of a roll-formed product cutting apparatus of a roll-forming unit, being applied to a manufacturing line for a refrigerant tube suitable for a heat exchanger such as a condenser.
Figure 4:
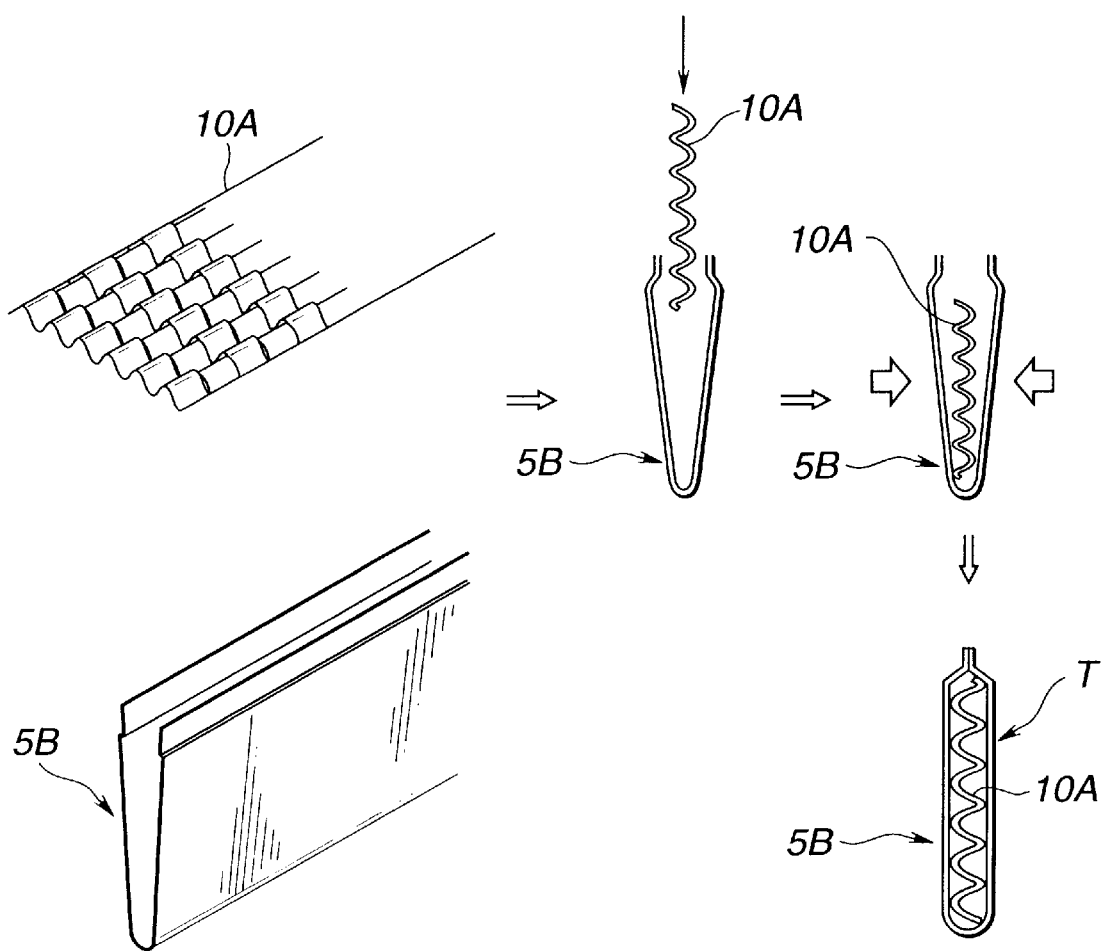
FIG. 4 is an explanatory view illustrating a forming process of the refrigerant tube formed through the manufacturing line of FIG. 3.

Referring now to the drawings, particularly to FIG. 3, the roll-formed product cutting apparatus of the invention is exemplified in a manufacturing line (a manufacturing system) for a heat exchanger tube such as a refrigerant tube used for a condenser. In the roll forming unit 1 shown in FIG. 3, a roll-forming machine 2, a drier 3, and a roll-formed product cutting apparatus 4 are arranged in a direction of the flow of a roll-formed product 5A, which will be fully described later, in that order. A strip-like metallic material 5, which is wound on a take-up spool or a take-up reel 6, is fed to a roll-forming machine 2. Then, the flat strip material 5, fed the reel 6 to the roll-forming machine 2, is subjected to multi-stage roll-forming with a plurality of forming rolls 2a. By way of the multi-stage roll-forming operations, the strip material 5 is gradually bent and roll-formed into a substantially V shape in lateral cross section. After this, the multi-stage roll-formed product 5A is introduced into the drier 3, so that oil, grease, or fatty material adhered onto the surface of the roll-formed product can be dried and thus removed. After the drying and degreasing process, the degreased, roll-formed product 5A is fed to the roll-formed product cutting apparatus 4. Within the roll-formed product cutting apparatus 4, the degreased, roll-formed product 5A is cut into a predetermined length. The degreased, roll-formed product of the predetermined cut length (simply the cut product) will be hereinafter referred to as a "holder 5B". Thereafter, the holder 5B is carried into a screw conveyor 7, which conveyor serves as a conveyance means for the cut product and is arranged in a direction perpendicular to the roll-forming and degreasing line of the roll-forming unit 1. The holder 5B (the cut product) is conveyed in the direction indicated by the arrow shown in FIG. 3. Also, a chain conveyor 8, which is used as a conveyance means for inner fins 10A, is arranged above and parallel to the screw conveyor 7. The inner fin 10A is produced by continually press-forming a strip-like metallic material 10 sent out from a take-up reel 9 by means of a press-forming machine 11. The inner fins 10A, continually produced by the press-formed machine 11, are carried in the same direction as the flow of the holder 5B. Additionally, the inner fin 10A is fallen down and inserted into the substantially V-shaped interior space of the holder 5B at the rearmost end portion of the chain conveyor 8 by virtue of an inner-fin insertion machine 12. At the late stage of the insertion process of the inner fin 10A into the holder 5B, the holder 5B having the substantially V-shaped open cross-section profile is deformed and the two opposing side wall portions of the holder 5B are narrowed and press-formed into a flat tubing having a substantially elliptical closed cross-section profile, so as to produce a refrigerant tubing product T (see FIG. 4). FIG. 4 shows details of a series of manufacturing processes for a refrigerant tubing product T. That is, the inner fin 10A is fallen down via the upper opening end of the holder into the substantially V-shaped holder interior space. Thereafter, the upper ends of the two opposing side walls of the holder 5B is narrowed and then closed in such a manner as to have the substantially elliptical closed cross-section profile by means of pressing, and consequently to produce a flat tubing T accommodating therein the inner fin 10A. In this manner, a series of refrigerant-tube manufacturing processes are performed.

Figure 1:
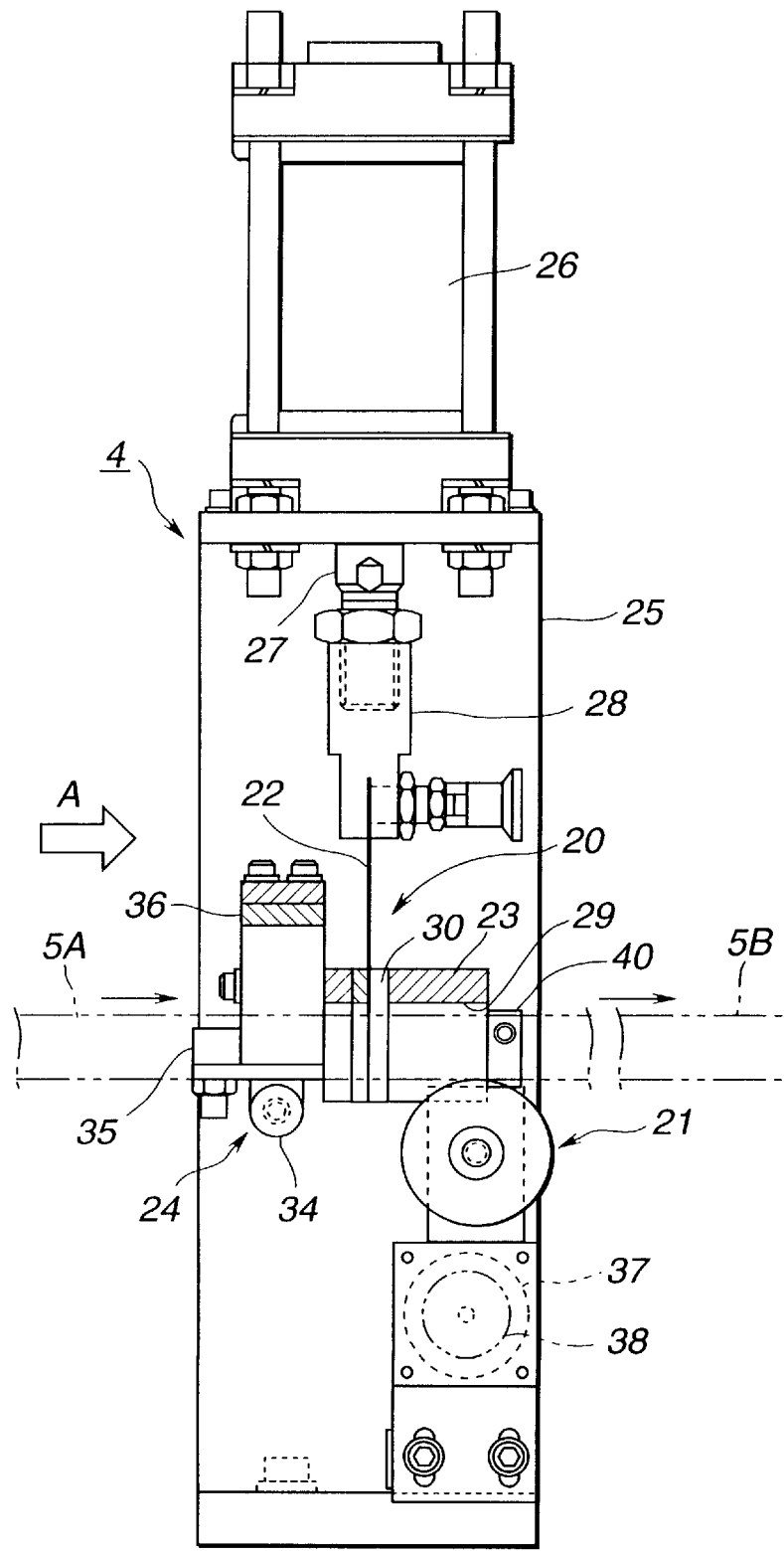
FIG. 1 is a partial cross-sectional view illustrating one embodiment of a roll-formed product cutting apparatus of a roll-forming unit according to the invention.
Figure 2:
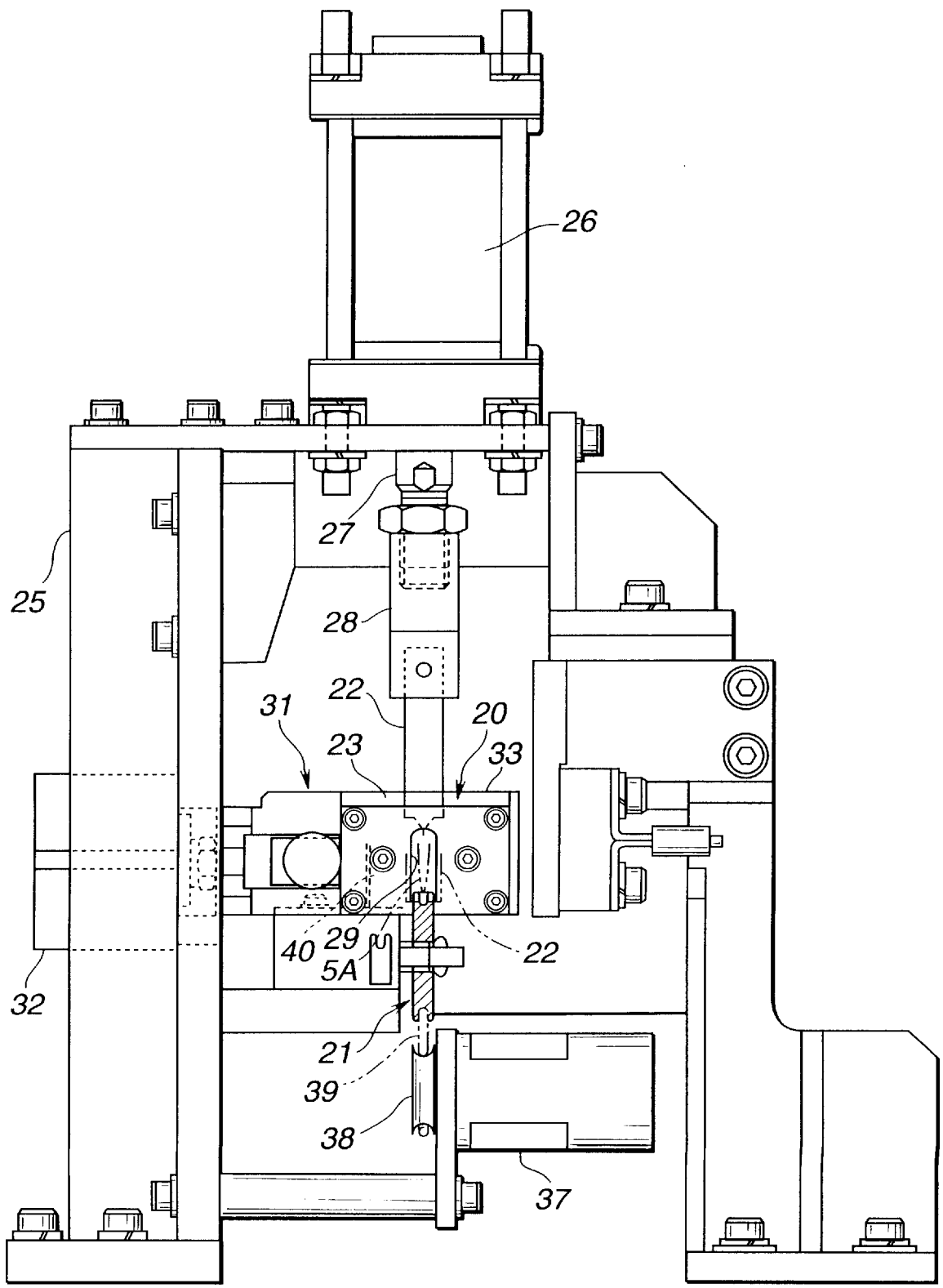
FIG. 2 is a elevation view taken in a direction indicated by the arrow A shown in FIG. 1.

Referring now to FIGS. 1 and 2, there is shown one embodiment of the roll-formed product cutting apparatus 4 arranged at the last stage of the manufacturing line of the roll forming unit 1. The roll-formed product cutting apparatus 4 includes a cutter mechanism 20 provided for cutting the roll-formed product 5A, and a feed roller 21 being rotated or driven at a required rotational speed or a controlled rotational speed to send out the product (cut by means of the cutter mechanism 20), that is, the holder 5B having the substantially V-shaped open cross-section profile, toward the screw conveyor 7 located downstream of the cutting apparatus 4. The cutter mechanism 20 is comprised of a movable cutter 22 located above the roll-formed product 5A in such a manner as to be movable toward and away from the roll-formed product 5A in a direction perpendicular to the flow of the roll-formed product 5A, a cutter guide 23 provided for guiding the roll-formed product 5A so that the roll-formed product 5A passes through the cutter guide 23, and for guiding the cutting motion (upward and downward movements) of the movable cutter 22 while being in sliding-contact with one side wall surface of the cutter guide 23, 22 and a roll-formed product introducing guide 24 provided for introducing the roll-formed product 5A toward within the cutter guide 23, while horizontally supporting the roll-formed product 5A. The movable cutter 22 is formed into a thin-plate shape. As best seen in FIG. 1, the movable cutter 22 is detachably connected to a cutter holder 28. The cutter holder 28 is screwed onto the lower male-screw threaded end portion of an operating rod 27 attached to an air cylinder 26. The air cylinder 26 is mounted on a base frame 25. The cutter guide 23 includes a substantially inverted U-shaped longitudinal groove 29 extending in the longitudinal direction of the cutter guide 23 for guiding the roll-formed product 5A to a predetermined route, and a vertical groove 30 extending in the vertical direction perpendicular to the longitudinal groove 29 for guiding the movable cutter 22 to a predetermined cutting path by means of the vertical groove 30. The relative-position relationship between the movable cutter 22 and the vertical groove 30 is determined so that the tip end portion (the lower end) of the movable cutter 22 is constantly in abutted-contact with the upper portion of the forward inside wall surface of the vertical groove 30, even when the movable cutter 22 is kept at its uppermost position. As clearly seen in FIG. 2, the cutter guide 23 is detachably mounted on the frame 25 by means of a clamping mechanism 31. The clamping mechanism 31 includes a hydraulic cylinder 32 and a holder frame 33 respectively installed on the frame 25. The roll-formed product introducing guide 24 includes a bottom-face guiding roller (simply a bottom roller) 34 being in contact with the bottom face of the roll-formed product 5A, and a pair of side-wall guiding rollers (simply a pair of side rollers) (35, 35) being in contact with respective side walls of the roll-formed product 5A in such a manner as to horizontally support and hold the roll-formed product 5A between the two side rollers (35, 35) and thus to stably introduce the roll-formed product 5A toward within the cutter guide 23. Each of the bottom roller 34 and the two side rollers (35, 35) is rotatably supported on a roller supporting frame 36 which is fixedly connected to the frame 25.

On the other hand, as seen in FIGS. 1 and 2, in a similar manner as the bottom roller 34, the feed roller 21 is also located at the underside of the roll-formed product 5A. As best seen in FIG. 1, the movable cutter 22 is arranged substantially midway between the bottom roller 34 and the feed roller 21. As can be appreciated from the elevation view of FIG. 1, the roll-formed product 5A is horizontally supported and held by the two bottom rollers 34 and 21. The feed roller 21 also functions as a supporting or holding roller for the roll-formed product 5A. The contact point of the feed roller 21 with the roll-formed product 5A sent into the cutting apparatus 4 is disposed within the longitudinally extending, inverted U-shaped groove 29 of the cutter guide 23. An electric motor 37 (a driving source) is fixedly connected to the base frame 25. A drive roller 38 is fixedly connected to the drive shaft of the motor 37. The feed roller 21 has a driven connection with the drive roller 38 via a driving-force or driving-torque transmitting belt 39. That is, the feed roller 21 is rotated or driven at a required rotational speed by means of the driving system consisting of the motor 37, the drive roller 38, and the drive belt 39. Actually, the drive belt is wound on part of the feed-roller annular groove portion formed along the outer periphery of the feed roller 21. Exactly speaking, the bottom face of the roll-formed product 5A is actually held or supported on a portion of the drive belt 39 wound on the feed roller 21. Also, a sensor 40 is provided downstream of the cutter guide 23 to detect or monitor a passing state of the cut product (the holder) 5B, and consequently to adjust or control an introduction timing of the roll-formed product 5A into the roll-formed product cutting apparatus 4, and a cutting timing of the roll-formed product 5A to be cut by the movable cutter 22.

With the above-described arrangement, the roll-formed product 5A formed to have a substantially V-shaped open cross-section profile by means of the roll-forming machine 2, is introduced into the roll-formed product cutting apparatus 4. At this time, a stroke of introduction of the roll-formed product into the cutting apparatus 4 is detected or measured by means of a length-measurement sensor (not shown) in a conventional manner. Immediately when a predetermined stroke of introduction of the roll-formed product 5A into the cutting apparatus 4 is detected by the length measurement sensor, the operation of the roll-forming machine 2 is suspended or stopped temporarily. Under this condition, the feed roller 21 continues to roll at the required rotational speed, and therefore the feed roller 21 (or the outer peripheral surface of the drive belt 39) rotates while sliding the bottom face of the roll-formed product 5A. On the other hand, the air cylinder 26 begins to operate as soon as the roll-forming machine 2 is stopped temporarily, so as to move the movable cutter 22 downwards and upwards and consequently to cut the roll-formed product 5A into a predetermined cut length. Upon termination of one cycle of the cutting operation, the cut product, that is, the holder 5B of the predetermined cut length is sent out toward the screw conveyor 7 at once by means of the feed roller 21 (see FIG. 3). As discussed above, according to the present embodiment, as soon as the roll-formed product 5A is cut by the movable cutter 22 of the cutter mechanism 20, the cut product (i.e., the holder) 5B is delivered or carried by means of the feed roller 21 rotating at the required rotational speed. Thus, the rear end portion of the holder 5B never remains within the roll-formed product cutting apparatus 4. Additionally, it is possible to accurately feed the holder 5B at a proper feed speed by way of the feed roller 21. There is less possibility that the holder 5B is jumped or overflowed from above the screw conveyor 7, thus enabling the cut product (the holder) 5B to properly accurately be carried or conveyed to a desired position for the next inner-fin insertion plus holder pressing process. As explained above, the roll-formed product 5A is introduced or fed toward within the cutter guide 23, while being horizontally held or supported by way of the roll-formed product introducing guide 24. Additionally, the tip end of the roll-formed product 5A is inserted into and guided by the inverted V-shaped longitudinal groove 29, thus effectively suppressing the blurring motion of the roll-formed product 5A flowing in the longitudinal direction by the longitudinal guiding groove 29, and also reducing a change in or a deviation from a desired cross-sectional form of the roll-formed product 5A having the substantially V-shaped open cross-section profile to the minimum. In addition to the above, since the relative-position relationship between the movable cutter 22 and the vertical groove 30 is determined so that the tip end portion of the movable cutter 22 is constantly in abutted-contact with the upper portion of the forward inside wall surface of the vertical groove 30, it is possible to precisely suitably cut the roll-formed product 5A. Furthermore, in the shown embodiment, it is possible to feed the cut product (the holder) 5B toward the screw conveyor 7 by means of the sole feed roller 21. Therefore, the roll-formed product cutting apparatus 4 is simple in structure, and thus it is possible to compactly design the cutting apparatus 4. Moreover, during the cutting process of the roll-formed product 5A with the movable cutter 22, the roll-formed product 5A can be stably horizontally held or supported by means of the bottom roller 34 of the roll-formed product introducing guide 24 and the feed roller 21. That is to say, the feed roller 21 also serves as a holding roller incorporated in the cutter mechanism 20, for holding stably horizontally supporting or holding the roll-formed product 5A, during the cutting process. This eliminates the necessity for an additional holding structure for horizontally holding the roll-formed product 5A during the cutting operation, thereby decreasing the number of parts constructing the roll-formed product cutting apparatus. This ensures a more simple roll-formed product cutting apparatus.

In the previously-described embodiment, the roll-formed product cutting apparatus of the invention is exemplified in a manufacturing line (especially a holder forming line) for a refrigerant tube used for a condenser. It will be appreciated from the above, that the concept of the invention can be widely applied to a forming line of a strip-like formed product (for example, other heat exchanger tubes, that is, a radiator tubing, a heater core tubing, an evaporator core tubing or the like). In the shown embodiment, although the feed roller 21 is constructed as a bottom roller placed at the underside of the bottom face of the roll-formed product 5A, a pair of side rollers, arranged in such a manner as to hold the side walls of the roll-formed product 5A therebetween, may be used as the feed roller. Alternatively, the feed roller 21 may be constructed as a top roller being in sliding-contact with the upper opening end of the roll-formed product 5A.

The entire contents of Japanese Patent Application No. P10-123537 (filed May 6, 1998) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An apparatus for cutting a roll-formed product for a roll-forming unit having at least a roll-forming machine, comprising:

a cutter mechanism that cuts the roll-formed product fed from the roll-forming machine into a predetermined cut length;

a feed roller that feeds the cut roll-formed product positioned next to and downstream of the cutter mechanism;

a screw conveyor that receives the cut roll-formed product from the feed roller positioned next to and downstream of the cutter mechanism;

the feed roller being controlled to synchronize with the screw conveyor to feed the cut roll-formed product into a designated position of the screw conveyor; and the cutter mechanism comprising:
  (i) a movable cutter movable toward and away from the roll-formed product in a direction perpendicular to the flow of the roll-formed product;
  (ii) a cutter guide that guides the roll-formed product so that the roll-formed product passes through the cutter guide, and guides the movable cutter while being in sliding-contact with the movable cutter; and
  (iii) a roll-formed product introducing guide that introduces the roll-formed product toward within the cutter guide, while horizontally supporting the roll-formed product.

2. The apparatus as claimed in claim 1, wherein the movable cutter is adaped to be located above the roll-formed product, whereas the feed roller is adapted to be located below the roll-formed product, and wherein the movable cutter is arranged substantially midway between the roll-formed product introducing guide and the feed roller, and the roll-formed product introducing guide and the feed roller cooperate with each other to horizontally support the roll-formed product.

3. The apparatus as claimed in claim 1, wherein the guide comprises a substantially inverted U-shaped longitudinal groove, which guides the roll-formed product to a predetermined route, and a vertical groove, which extends in a vertical direction perpendicular to the longitudinal groove for guiding the movable cutter to a predetermined cutting path, while being in sliding-contact with one side wall surface of the movable cutter.

4. The apparatus as claimed in claim 1, wherein the roll-formed product introducing guide comprises a bottom roller contactable with a bottom face of the roll-formed product, and a pair of side rollers contactable with respective side walls of the roll-formed product to horizontally hold the roll-formed product between th epair of side rollers and to stably introduce the roll-framed product toward within the cutter guide.

5. In a system for manufacturing a heat exchanger tube, an apparatus that cuts a roll-formed product for a roll-forming unit having at least a roll-forming machine roll-forming a strip material into a predetermined shape to produce the roll-formed product, and a drier that removes fatty material adhered onto the roll-formed product to produce a roll-formed, degreased product, the cutting apparatus comprising:

a cutter mechanism that cuts the roll-formed, degreased product fed from the drier into a predetermined cut length;

a feed roller that feeds the cut roll-formed, degreased product positioned next to and downstream of the cutter mechanism;

a screw conveyor that receives the cut roll-formed product from the feed roller positioned next to and downstream of the cutter mechanism;

the feed roller being controlled to synchronize with the screw conveyor to feed the cut roll-formed, degreased product into a designated position of the screw conveyor; and a sensor for detecting a passing state of the roll-formed, degreased product cut by the cutter mechanism, so that an introduction timing of the roll-formed, degreased product into the cutter mechanism and a cutting timing of the roll-formed, degreased product are adjusted by the passing state detected by the sensor.

6. The apparatus as claimed in claim 5, wherein the cutter mechanism comprises:
  (i) a movable cutter movable toward and away from the roll-formed, degreased product in a direction perpendicular to the flow of the roll-formed, degreased product;
  (ii) a cutter guide that guides the roll-formed, degreased product so that the roll-formed, degreased product passes through the cutter guide, and guides the movable cutter while being in sliding-contact with the movable cutter; and
  (iii) a roll-formed product introducing guide that introduces the roll-formed, degreased product toward within the cutter guide, while horizontally supporting the roll-formed, degreased product.

7. The apparatus as claimed in claim 6, wherein the movable cutter is adapted to be located above the roll-formed, degreased product, whereas the feed roller is adapted to be located below the roll-formed, degreased product, and wherein the movable cutter is arranged substantially midway between the roll-formed product introducing guide and the feed roller, and the roll-formed product introducing guide and the feed roller cooperate with each other to horizontally support the roll-formed, degreased product.

* * * * *